(12) United States Patent
Krishnaswamy et al.

(10) Patent No.: US 10,002,185 B2
(45) Date of Patent: Jun. 19, 2018

(54) CONTEXT-AWARE COGNITIVE PROCESSING

(71) Applicant: International Business Machines Corporation, Armonk, NY (US)

(72) Inventors: Dilip Krishnaswamy, Bangalore (IN); Abhishek Shivkumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 14/668,129

(22) Filed: Mar. 25, 2015

(65) Prior Publication Data

US 2016/0283494 A1    Sep. 29, 2016

(51) Int. Cl.
   *G06F 17/30* (2006.01)

(52) U.S. Cl.
   CPC ............ *G06F 17/30663* (2013.01)

(58) Field of Classification Search
   CPC ............ G06F 17/3066; G06F 17/30663
   See application file for complete search history.

(56) References Cited

U.S. PATENT DOCUMENTS

| | | | |
|---|---|---|---|
| 6,480,698 B2 | 11/2002 | Ho et al. | |
| 6,496,681 B1 * | 12/2002 | Linton | G09B 7/02 434/322 |
| 6,633,742 B1 * | 10/2003 | Turner | G09B 5/00 434/350 |
| 7,243,092 B2 | 7/2007 | Woehler et al. | |
| 7,266,548 B2 | 9/2007 | Weare | |
| 8,356,997 B1 | 1/2013 | Bergeron | |
| 8,366,449 B2 | 2/2013 | Wang | |
| 8,762,152 B2 | 6/2014 | Bennett et al. | |
| 9,286,910 B1 * | 3/2016 | Li | G10L 25/48 |
| 2001/0049688 A1 * | 12/2001 | Fratkina | G06F 17/30654 |
| 2005/0055321 A1 * | 3/2005 | Fratkina | G06F 17/30654 706/45 |

(Continued)

FOREIGN PATENT DOCUMENTS

WO    2014070467 A1    5/2014

OTHER PUBLICATIONS

Krishnaswamy et al. Bringing Knowledge to the Edge using JnanaEdge and BuddhiEdge: Architecture, Implementation, and Future Directions, IEEE Technology for Education 2014 conference.

Erkan et at. Lexrank:Graph-based Centrality as Salience in Text Summarization. Journal of Artificial Intelligence Research (JAIR), 2004.

(Continued)

*Primary Examiner* — Leslie Wong
(74) *Attorney, Agent, or Firm* — Ryan, Mason & Lewis, LLP

(57) ABSTRACT

Methods, systems, and computer program products for context-aware cognitive processing are provided herein. A method includes creating a progressively increasing map of a knowledge state as a function of time based on one or more topics covered during a user session by utilizing one or more processing techniques to process at least one of (i) text input, (ii) audio input and (iii) video input derived from content of the user session; analyzing a knowledge base to determine a response to a user query submitted during the user session; and customizing the response to the user based on (i) the map of the knowledge state and (ii) a collection of one or more items of context information pertaining to the user.

16 Claims, 5 Drawing Sheets

(56) References Cited

U.S. PATENT DOCUMENTS

| | | | | |
|---|---|---|---|---|
| 2007/0164846 | A1* | 7/2007 | Pedolsky | G06F 21/34 340/5.2 |
| 2008/0077609 | A1* | 3/2008 | Ronen | G06Q 10/00 |
| 2009/0035733 | A1* | 2/2009 | Meitar | G09B 7/00 434/118 |
| 2009/0202969 | A1* | 8/2009 | Beauchamp | G06N 5/02 434/335 |
| 2011/0066998 | A1* | 3/2011 | Scandura | G06N 5/022 717/100 |
| 2011/0129808 | A1 | 6/2011 | Srivastava | |
| 2011/0161174 | A1* | 6/2011 | Simms | G06F 17/30029 705/14.58 |
| 2011/0218960 | A1* | 9/2011 | Hatami-Hanza | G06F 17/30 707/603 |
| 2012/0179642 | A1* | 7/2012 | Sweeney | G06F 17/2785 706/55 |
| 2013/0007020 | A1 | 1/2013 | Basu et al. | |
| 2015/0142704 | A1* | 5/2015 | London | G06N 5/04 706/11 |
| 2015/0213728 | A1* | 7/2015 | Lee | G06Q 50/20 434/362 |

OTHER PUBLICATIONS

Mihalcea et al. 2004 TextRank: Bringing Order into Texts, Department of Computer Science University of North Texas a Survey on Automatic Text Summarization, Language Technologies Institute, Carnegie Mellon Univ.

Wikipedia, Merge Linguistics, https://en.wikipedia.org/w/index.php?title=Merge_(linguistics)&oldid=636509604, Dec. 3, 2014.

Frampton et al. Remarks on Derivation by Phase: Feature Valuation, Agreement, and Intervention, Oct. 2000.

Chomsky, Beyond Explanatory Adequacy, 2004.

Wikipedia, Constituent (linguistics), https://en.wikipedia.org/w/index.php?title=Constituent_(linguistics)&oldid=650780774, Mar. 10, 2015.

Wikipedia, Coordination (linguistics), https://en.wikipedia.org/w/index.php?title=Coordination_(linguistics)&oldid=611496043, Jun. 4, 2014.

Wikipedia, XMind, https://en.wikipedia.org/w/index.php?title=XMind&oldid=645071179, Feb. 1, 2015.

Lowkeytech, Convert Structured Text into Mind Maps in Seconds, http://lowkeytec.blogspot.in/2010/05/import-structured-text-in-mind-maps.html, May 2010.

* cited by examiner

CONTEXT-AWARE COGNITIVE PROCESSING

FIELD

The present application generally relates to information technology, and, more particularly, to query processing techniques.

BACKGROUND

Challenges exist in the endeavor of dynamic cognitive query processing on a large volume of pre-processed data. For example, consider a scenario wherein a user is watching a video lecture. The user may want to pause the video and ask a question regarding certain information presented to the user in the video, wherein the answer to the user's question may not be contained in the video. However, in such environments, there is no teacher or instructor available to respond to the user's question, as the information flow is one-directional from the backend server to the user. The user could, for instance, type a question into an independent search engine, and that search engine may provide a response, regardless of the video content in the lecture. However, such a response would not share and/or process the content that the user is receiving via the video lecture, nor would the response incorporate the context associated with the processing of the presented content. Alternatively, having a human available in conjunction with the video lecture to serve as a teacher can be cost prohibitive in terms of scaling to a potentially large number of users in such environments (such as, for example, online environments).

SUMMARY

In one aspect of the present invention, techniques for context-aware cognitive processing are provided. An exemplary computer-implemented method can include steps of creating a progressively increasing map of a knowledge state as a function of time based on one or more topics covered during a user session by utilizing one or more processing techniques to process at least one of (i) text input, (ii) audio input and (iii) video input derived from content of the user session; analyzing a knowledge base to determine a response to a user query submitted during the user session; and customizing the response to the user based on (i) the map of the knowledge state and (ii) a collection of one or more items of context information pertaining to the user.

In another aspect of the invention, an exemplary computer-implemented method can include steps of creating a progressively increasing map of a knowledge state of multiple topics covered during a portion of video content viewed by a user, wherein said creating comprises utilizing one or more processing techniques to process at least one of (i) text input, (ii) audio input and (iii) video input derived from the video content; analyzing a knowledge base to determine a response to a user query submitted during the portion of the video content viewed by the user; customizing the response for the user based on (i) the map of the knowledge state and (ii) a collection of one or more items of context information pertaining to the user; presenting the customized response to the user subsequent to the user query being submitted; and presenting, to the user during the portion of the video content viewed by the user, (i) one or more additional queries submitted by one or more additional users and (ii) responses corresponding thereto.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1A:
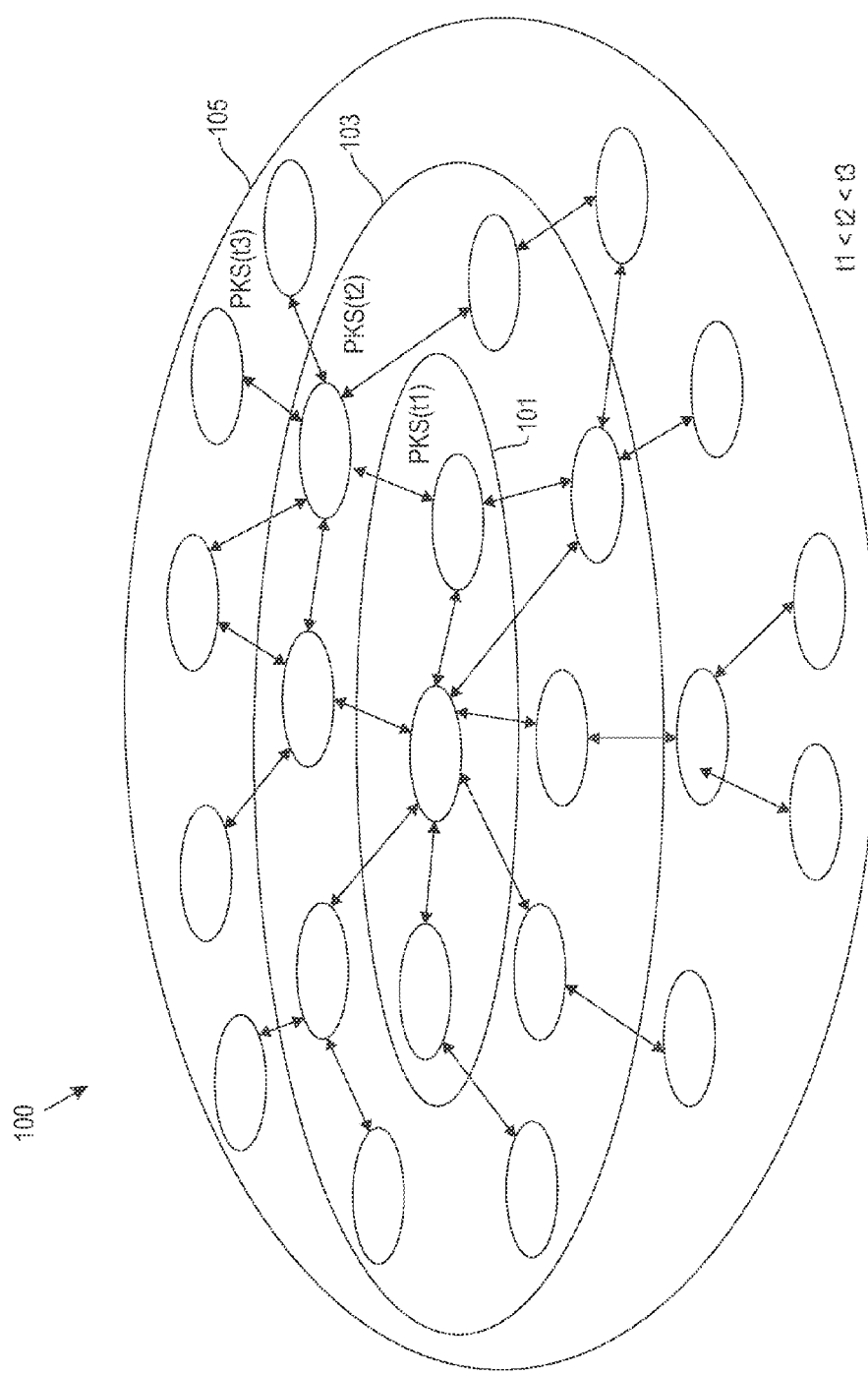
FIG. 1A is a diagram illustrating an abstract mind map, according to an example embodiment of the invention.

As described herein, an aspect of the present invention includes progressive context-aware cognitive processing. At least one embodiment of the invention includes processing user queries associated with content such as educational content, wherein the queries are processed by capturing the user's context over a period of time. Context, as used herein, refers to a given user's current knowledge state based on the user's interaction with an educational knowledge server, wherein the knowledge state is represented by the accumulation of knowledge based on the content processed by the user, and wherein the content was provided by the server and the accumulated knowledge increases over time. Such an example embodiment includes creating a mind map of topics processed by the user.

As used herein, a mind map refers to a hierarchical tree of knowledge (or a knowledge state) or a combination of hierarchical trees of knowledge associated with the content processed by the user, wherein each node of the tree represents a topic or body of knowledge, and the edges between the nodes can reflect a correlation associated with knowledge across nodes, a time dependency of information being presented, or both. Each node in the tree that represents a topic or body of knowledge can have a set of keywords or a tree of knowledge buried within that node, so that the mind map representation can be hierarchical and multi-dimensional with embedded knowledge trees within knowledge trees. Keywords associated with a node in a tree can be used to represent information relative to that node. Alternatively, all of the content associated with an embedded sub-tree can represent the knowledge in that node. When considering multiple mind map trees associated with different content, the trees can be connected at the roots, or one tree can merely be appended as a sub-tree to a larger tree of knowledge. As the knowledge state of the user grows, the associated mind map progressively grows in time. The associated mind map reflects the nodes in the collection of mind map trees that have been presented to the user and assimilated by the user. Presentation of content may not represent assimilation, for example, so that assimilation of knowledge can be determined based on tests posed to the user to understand the knowledge of the user. Therefore, two mind map states can exist for the user—a first state reflecting the state associated with the presented content, and a second state associated with the assimilated knowledge relative to the first state. The assimilated knowledge state is a subset of knowledge associated with the presented knowledge state, wherein the subset can represent a proper subset or represent equality in knowledge. If the assimilated knowledge state is not known, then the presented knowledge state can be assumed to be the assimilated knowledge state in one or more embodiments of the invention. At least one embodiment of the invention can also include providing a response relative to either the presented knowledge state or a known assimilated knowledge state associated with the user.

As detailed herein, a progressive mind map state is created in connection with a given user by utilizing language processing techniques such as speech-to-text conversion techniques, and the progressive mind map state indicates contents covered in a user session as a percentage of the total content. A user session can include, for example, a current set of audio, visual and/or text content being presented to the user, and can also include multiple sets of content presented to the user over a given period of time.

One or more embodiments of the invention can also include querying a knowledge base (such as, for example, IBM Watson™) and customizing answers based on the mind map of topics covered by the user. Further, such an embodiment can include adding and/or incorporating local context of the user to a global context that progressively grows as and when the user engages with one or more additional audio, video and/or text content available in a given system. As detailed herein, at least one embodiment of the invention is applicable across multiple collections and/or entities of content, which can be derived, for example, from one or more educational or knowledge sources of information from different institutions or knowledge servers.

As such, at least one embodiment of the invention includes generating and managing a cognitive platform to learn with the user and dynamically understand and infer the context surrounding the content being presented and/or learned. Such an embodiment of the invention includes learning the information that has been presented to the user until the moment in time when the user would like to interact with the cognitive system. The entire set of information presented to the user is analyzed to mimic the state of the user with regard to increasing the knowledge that was presented to the user. Based on the inferred user state and the query posed to the cognitive platform, the platform determines the most relevant information for the user and presents such information to the user.

In addition, as questions are posed and answers provided, such interactions can be recorded and stored for future use. At a future time, when a different user (for example, a student) interacts with the system for the same content, questions presented by other previous users and their related answers can be presented to the user, to provide the interactive nature of a classroom session. Thus, at least one embodiment of the invention includes using progressively increasing context information associated with the user, along with aggregate information from interactions with other (past) users, to provide a richer experience to a user. Additionally, in one or more embodiments of the invention, an instructor (or other authorized user) who prepared the content can review a progressively increasing state associated with the content to refine the content further.

By way of example, in connection with one or more embodiments of the invention, a user can pause a video (such as a video lecture) at any particular time instance and ask a question by typing the question into a user interface (UI). The cognitive platform implementing an embodiment of the invention can implement a local agent that is processing a local context with progressively increasing knowledge associated with the user. The local agent, as implemented in such an embodiment, can be a software module present on a local device associated with the user, or a local server in a local area network associated with the user. In one or more embodiments of the invention, the local agent can execute remotely as well, such as, for example, in a remote cloud server, an enterprise server, an educational institution server, or a home-network server.

The local agent can utilize mechanisms such as speech-to-text conversion of the audio associated with the video content, and extract context information from visual attributes of the video. A speech-to-text converter module can, for example, provide a textual representation of the audio content for storage and searching. The conversion can be carried out in real-time or, alternatively, such a conversion can be pre-processed prior to presentation of the content to the user. Also, as noted, processing of the video in real-time to extract context information associated with the video can be carried out as well. A progressively increasing state associated with knowledge as a function of time associated with the content presented to the user is created based on such audio and video context information.

When the user poses a query at a given instance of time during the content presentation, at least one embodiment of the invention includes searching a database containing pre-processed stored information, wherein such stored information is created based on queries related to the content that has been presented to the user, which enables one or more embodiments of the invention to include accumulating and learning the nature of the information or knowledge being presented to the user. As an example, such an embodiment can include creating a database of topics related to a mind map tree of topic nodes and related keywords associated with the content being presented to the user. Pre-processing the content can facilitate a faster search and response when a user poses a query relative to the content being presented. When the question is posed, one or more embodiments of the invention can include leveraging a cognitive platform based on an entity such as, for example, IBM Watson™, to determine an answer from an associated knowledge repository. If video content is pre-processed, at least one embodiment of the invention can also include referring the user to future content that would appear shortly if the user continued processing the video. Alternatively, at least one embodiment of the invention can also refer the user to alternative content such as an alternate video, and a relevant time interval in the alternate video wherein useful information can be obtained. In yet another alternative, at least one embodiment of the invention can also present a response to the user based on an associated knowledge repository.

In at least one embodiment of the invention, a complexity level associated with the content can be inferred to determine a complexity level of the response to the user, as well as the user's knowledge level. The user's knowledge level can be inferred based on a static profile, or a dynamic profile that is refined as the user processes additional content. User queries and responses thereto can be stored to develop a progressively increasing state of the content across multiple users. For example, questions asked during a given video by one or more users can appear as pop-ups at their respective time instances when the video is subsequently played. This will enable users to potentially better engage with the learning system. From a suite of previously stored questions, a targeted and/or random set of questions can be inserted into given content. If there is additional information learned about the user based on the user's state of knowledge related to the content (through explicit queries given to the user or based on information that the user has previously processed) and the user's profile, a relevant set of questions can be chosen that are expected to be more relevant to the user profile.

The progressively increasing state of the content can be used to assist an instructor, who benefits by gaining more visibility to what questions are being asked by students (users). The teacher can also evaluate student performance and assist in refining the content based on the questions being asked.

Additionally, at least one embodiment of the invention can be implemented as a cloud service that can be provided, for example, to (online) education content providers.

Figure 1B:
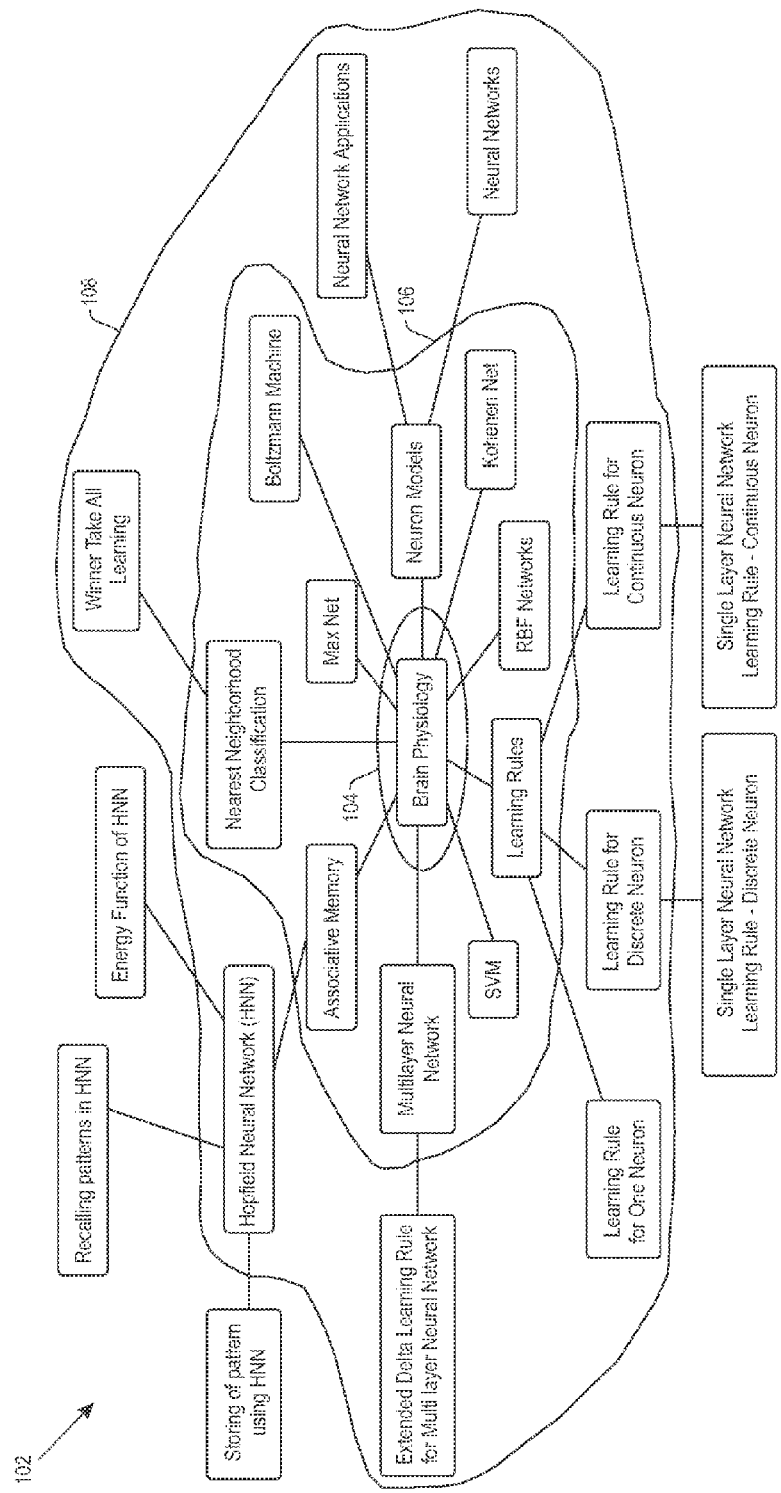
FIG. 1B is a diagram illustrating an example mind map, according to an example embodiment of the invention.

As detailed herein, and further depicted in FIG. 1A and FIG. 1B, at least one embodiment of the invention includes determining a progressively varying mind map state of a user, relative to content that the user is consuming, by a server (for example, a remote server) to enable the server to understand and/or learn the current knowledge state of the user. Such an embodiment can also include communication of such a state from a client device (such as a laptop, smart phone, etc.) to the remote server, wherein the client device associated with the user infers the state.

One or more embodiments of the invention can also include utilizing the mind map state and/or context associated with the user to provide a response to a query posed by the user that leverages knowledge of that state and/or context. Additionally, the mind map state of the user can further be utilized to present (as pop-ups on the user's screen, for example) previously processed questions and answers (or a subset of such questions and answers) that were accumulated near the user's mind map state from previous sessions of other users. Accumulation near the user's mind map state can relate to aggregation of questions and answers from other user sessions. Such questions and answers can include questions that were posed during a particular time period, wherein the particular time period can reside within a time interval relative to the current time associated with the content being presented to the user. Alternatively, such questions and answers can include questions that were posed in a relative geographic region, wherein the relative geographic region can reside within a location of correlated content relative to the content being presented to the user.

Also, at least one embodiment of the invention includes preprocessing of mind maps of different content in addition to the content being presented to the user. Such an embodiment can subsequently provide information or compose a response to the user, such that the user is provided information related to such associated content as a reference.

Further, as detailed herein, one or more embodiments of the invention can include combining the mind map state of a user with a profile associated with the user profile to select useful information or provide a response to a user query. Such a profile can include information such as, for example, age of the user, previously accumulated knowledge in different related topics, depth of knowledge of the user in different related topics, etc.

FIG. 1A is a diagram illustrating an abstract mind map, according to an example embodiment of the invention. By way of illustration, FIG. 1A depicts an abstract mind map 100, wherein the nodes represent different topics or bodies of knowledge, and the progressively increasing contours, 101 (PKS(t1)), 103 (PKS(t2)) and 105 (PKS(t3)), reflect the increase in knowledge state of the user as a function of time. As used herein and in connection with FIG. 1A, "PKS(t)" represents a progressive knowledge state contour as a function of time (t).

FIG. 1B is a diagram illustrating an example mind map, according to an example embodiment of the invention. By way of illustration, FIG. 1B depicts an example mind map 102 that can be used to represent the gradual growth of a given user's knowledge. FIG. 1B is a specific example mind map for a specific overall body of knowledge (related to a course on neural networks, in this example), with different nodes representing different topics covered during the course. Contours 104, 106 and 108 around the topics in the course reflect the progressive increase in knowledge as the course progresses over time (akin to the PKS(t) contours depicted in FIG. 1A).

With regard to mind map creation, at least one embodiment of the invention includes converting audio (for example, speech) and/or video input to a mind map representation via an intermediate text representation (that is, audio/video→text→mind map), with incremental additions to the mind map with further audio, video and/or text processing. One or more embodiments of the invention can also include a direct conversion from text input to a mind map based on available text for the given content. Further, at least one embodiment of the invention can include comparing a dynamic user state with a pre-processed mind map graph for the given content. Correlation with a pre-processed mind map graph of the content can facilitate faster processing of queries from a user relative to the dynamic knowledge state associated with the user.

Consider, by way of illustration, the following equations and descriptions, wherein Q represents a question, C represents content, R(t) represents a response at time t, and PKS(t) represents a progressive knowledge state at time t, and F represents a function of the question Q and the state PKS(t), such that R(t) is a response derived based on Q and PKS(t). As such, and in accordance with at least one embodiment of the invention, R(t)=F(Q, PKS(t)). Moreover, PKS(t) can be determined by processing content C with increasing knowledge as a function of time. Such processing can be carried out in real-time (along with the student or user), or such content C can be pre-processed and stored along with the content associated with different time-stamps (in the content). R(t) can be further augmented by user-knowledge based on past user learning such that a modified R'(t) is presented to the user.

Additionally, at least one embodiment of the invention includes storing tuples ($Q_i$, $R_i(t)$) based on past interactions with users. Accordingly, user-specific information R'(t) can be stored for a specific user, while not being used for other users.

As described herein, at least one embodiment of the invention can also include dynamic content augmentation to mimic a live classroom experience. By way of illustration, C'=C+tuple ($Q_k$, $R_k(t)$), wherein $R_k(t)=F(Q_k, PKS(t))$ from a past user interaction, such that tuple ($Q_k$, $R_k(t)$) is presented at original time t in content C. As also detailed herein, one or more embodiments of the invention can include randomized content augmentation, wherein a tuple ($Q_k$, $R_k(t)$) is inserted at original time t in content C, and wherein the insertion event is randomly selected among various available tuples based on a random distribution and selecting questions that might be of interest to a specific user based on a user profile.

Figure 2:
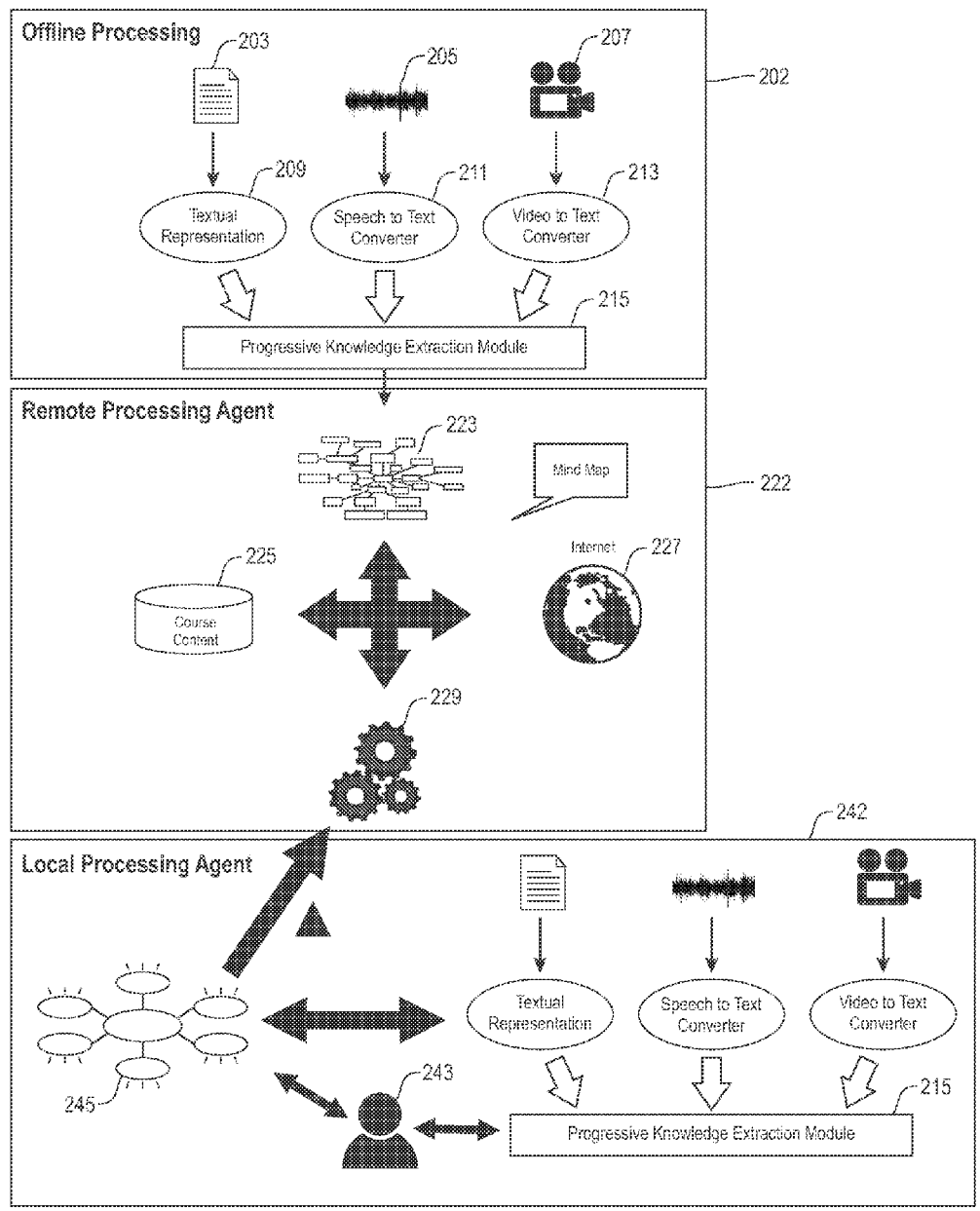
FIG. 2 is a diagram illustrating system architecture, according to an example embodiment of the invention.

FIG. 2 is a diagram illustrating system architecture, according to an example embodiment of the invention. By way of illustration, FIG. 2 depicts an offline processing aspect 202, a remote processing agent aspect 222 and a local processing agent aspect 242. In offline processing 202, textual content 203, audio content 205 and video content 207 can be represented as a textual representation 209, processed via a speech-to-text converter 211, and processed via video-to-text converter 213, respectively. Topics can then be extracted from derived textual content via a progressive knowledge extraction module 215, and expressed as a mind map 223.

The remote processing agent aspect 222 includes utilization of the mind map 223, a database 225 containing relevant content, material derived from the Internet 227, and information processed by a computing entity 229. By way of example, processing entity 229 (such as a computing processor with memory) can be present in the remote processing agent and work in conjunction with a combination of components 223, 225, and 227, as well as information received from the local processing agent 242. The remote processing entity 229, for example, can take input from the local processing agent 242, which can include a locally extracted knowledge state of the user and a query posed by the user. The remote processing computing entity 229 can attempt to generate a response based on querying database 225 with related content associated with the content presented to the user, wherein the content presented can be represented by the mind map 223 of topics covered. In addition, the remote processing entity 229 can interact with other knowledge servers over the internet 227 to generate the response to the query posed by the user.

Additionally, referring to the local processing agent aspect 242, a given user 243 provides additional input in conjunction with the offline processing aspect 202 and the remote processing agent aspect 222. The local processing agent 242 can continually update the knowledge state of the user 243 based on the content being presented to the user. This can be carried out by creating a mind map 245 associated with the content, which can additional include speech/video-to-text conversion of topics associated with the content by module 215 to create a text-based representation of the knowledge state mind map of the user. As noted, user 243 is a user of the system whose knowledge progressively increases as the user interacts with the system.

As detailed herein in connection with one or more embodiments of the invention, a mind map maintains a time-varying state of a given user who is watching a given video (such as a student watching a video lecture). The local context relative to the given user and the given video is added to a global context that progressively grows as and when the given user engages with additional videos in a given collection. Additionally, local and global context enable personalization and/or customization of answers in response to queries put forth by the given user.

The evolving mind map represents various topics of the content captured (for example, covered by the user), until a particular time, in the form of a tree, for instance. Each topic can be further associated with a percentage indicating how much of that topic has been covered by the user with respect to the current content in the user's session. When a user asks a question at a particular time, the local processing agent 242 sends the question and the mind map 245 generated until that time to the remote server 222 for processing. The remote server 222 compares the input mind map 245 with the mind-map representing the complete content 223 (that has been generated offline), queries the knowledge base 225 for answers to the input question and customizes the answer for the user. Customization can be based on the percentage of topic coverage. The answers generated can also either be references to other content pieces in the system, answers from the web 227 or the complete content in which the user is currently engaged.

One or more embodiments of the invention also include supporting a passive user that may not ask a question during the experience of a classroom. In this regard, such an embodiment of the invention includes storing past interactions with other students, and selectively presenting questions and answers based on one or more of those past interactions by determining a level of relevance of each stored interaction to the current student that is (currently) interacting with the server. By way of example, at least one embodiment of the invention can include the following actions.

1. A level of interaction of the user with the system is determined. This can be a fuzzy classification such as a hyper-passive user, passive user, semi-passive user, semi-active user, active user, hyper-active user, etc.

2. Depending on the level of interaction, at least one embodiment of the invention includes deciding to insert questions and answers based on past interactions with previous or other users that interacted with the system. Such a decision includes determining how many of the questions and answers based on past interactions to insert in a given lecture, as well as where to insert the selected interactions in the lecture. These past interactions can include, for example: a) questions and answers with other users, b) a discussion between one or more students and a teacher in a live guided session that utilized the lecture, and/or c) audio, video and/or text input from other users/students or participants that utilized the lecture. Such content can also be a pre-determined input or an override option selected by the current user for the level of insertion of past interactions desired by the user. Additionally, the current user can also disable such insertions, or can mark insertions at an active level, even if the user is active/hyper-active, etc.

For example, for a hyper-passive user, at least one embodiment of the invention can include inserting a given number of questions and answers from past interactions with other students (for instance, one question every six minutes; so, 10 questions for a one-hour lecture). For a passive user, for example, eight questions can be inserted for a one-hour hour lecture. For a semi-passive user, for example, six questions can be inserted for a one-hour hour lecture. For a semi-active user, for example, four questions can be inserted for a one-hour hour lecture. For an active user, for example, two questions can be inserted for a one-hour lecture. For a hyper-active user, for example, the system might not insert any questions at all (that is, zero questions inserted for a one-hour hour lecture).

3. For questions posed by the user, the response determination can be carried out as described herein.

4. For questions inserted to improve the classroom experience, one or more embodiments of the invention can include carrying out the following actions:

a. Process past interactions such as questions and answers, discussions, and/or inputs, determine relevance to the content relative to the progressive mind map associated with the content, and utilize the recorded time of the past interactions to determine an approximate time window to insert a question and answer based on a past interaction (into the current lecture).

b. Determine how many questions (or other forms of content) to insert based on the level of activity of the current user. For example, if activity is low and is detected in the first several minutes, more questions can be inserted randomly (as a single question or a cluster of questions) in the later part of the lecture.

c. Determine when and/or where to insert the question (or other content) relative to the current progressive mind map knowledge state PKS(t) associated with the content. For example, if the input was pre-determined by the user, at least one embodiment of the invention can include determining when and/or where to insert the questions. The user can also choose to pre-specify the insertion method (random versus at the end of the lecture, etc.). Additionally, regarding inserting questions, at least one embodiment of the invention can include creating and presenting a question and answer. Such an option can be implemented, for example, if there are not adequate questions to insert for the user's knowledge level and/or state that can be obtained from past interactions with other students.

5. In at least one embodiment of the invention, one or more of the following steps can be carried out on a remote server or a local client device.

a. Wherein the current mind map and/or knowledge state is determined by a remote server and the questions and answers based on past interactions to present to the user are selected by the remote server and communicated to the local client device, the local client device (that is, an application on the local client device) can determine where to insert the questions and answers based on past interactions.

b. Wherein the questions and answers based on past interactions are selected by the remote server, the mind map state is determined by the local client device, and the location to insert relative to the progressive knowledge state can be determined by the local client device.

c. Wherein all decisions are taken by the remote server, the local client device can merely insert as suggested by the remote server.

6. In at least one embodiment of the invention, a subset of the relevant questions and answers based on past interactions can be selected, wherein such a subset can be selected based, for example, on a random distribution.

7. In at least one embodiment of the invention, a subset of the relevant questions and answers based on past interactions can be selected, wherein the subset of questions and answers based on past interactions is selected based on a determination of relevance to the user, a user profile and/or the knowledge level of the user relative to the content (age, gender, location, language, topics of interest, previously accumulated knowledge in different topics, depth of knowledge of the user in different topics, etc.).

a. Wherein past interactions can be preprocessed at a remote server, further user-specific filtering can be carried out dynamically in real-time based on a user-profile/user-knowledge state.

b. Wherein the user-profile/knowledge state is only local to the client device such that the user-specific filtering is carried out on the client device, or the user-profile/knowledge-state is available on the remote server such that the user-specific filtering is carried out on the remote server, or such that a first user-specific filtering (such as based on a coarse user-profile such as based on demographics or coarse knowledge-state) is carried out on the remote server, and a second user-specific filtering (with more specific information about the user such as user preferences, or a user-specific local knowledge inference) is carried out on the client device.

8. At least one embodiment of the invention includes converting video and/or speech in the content to text to enable correlation of the content with the past interactions.

9. Additionally, at least one embodiment of the invention includes converting the questions and answers based on past interactions into speech and/or video and inserting the converted materials in the content at a relevant location. Further, one or more embodiments of the invention can include text-to-speech conversions, wherein such conversions can be carried out in connection with a spoken language, a dialect, or a language variant that is of interest to the user (which can be based, for example, on the user profile).

Figure 3:
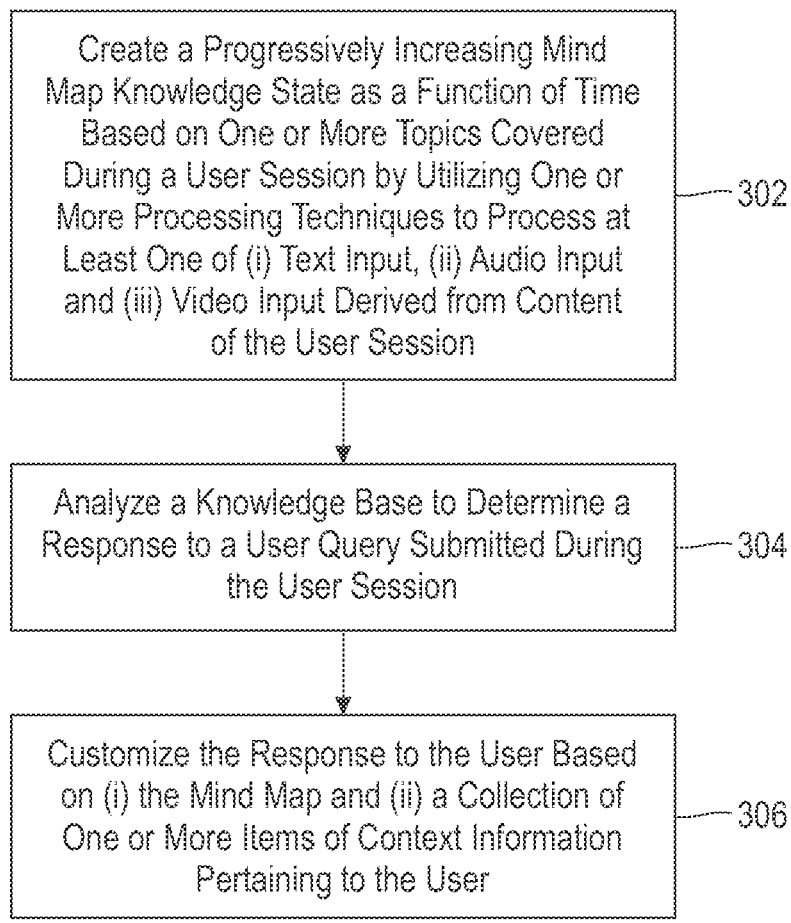
FIG. 3 is a flow diagram illustrating techniques according to an embodiment of the invention.

FIG. 3 is a flow diagram illustrating techniques according to an embodiment of the present invention. Step 302 includes creating a progressively increasing map of a knowledge state (also referred to herein as a mind map) as a function of time based on one or more topics covered during a user session by utilizing one or more processing techniques to process at least one of (i) text input, (ii) audio input and (iii) video input derived from content of the user session. In at least one embodiment of the invention, each of the one or more topics of the map of the knowledge state is associated with a percentage indicating how much of the given topic has been covered by the user during the user session. Also, the one or more items of context information pertaining to the user can include a level of activity of the user The processing techniques can include a speech-to-text conversion technique, a video extraction technique to determine one or more visual attributes of the content of the user session, and/or a conversion technique to transfer the text input to the map of the knowledge state based on available text of the content of the user session. Additionally, utilizing the one or more processing techniques can be carried out in real-time during the user session, or can be carried out prior to the user session.

Step 304 includes analyzing a knowledge base to determine a response to a user query submitted during the user session. Step 306 includes customizing the response to the user based on (i) the map of the knowledge state and (ii) a collection of one or more items of context information pertaining to the user. Customizing the response can include comparing the map of the knowledge state to a pre-processed map of a knowledge state generated for the content of the user session. Also, customizing the response can include referring the user, in the response, to a portion of the content not yet covered during the user session. Further, customizing the response can include referring the user, in the response, to separate content from the content of the user session, and more particularly, to a given time interval in the separate content.

The techniques depicted in FIG. 3 can also include adding one or more items of context information pertaining to the user to the collection for each additional user session. Additionally, one or more embodiments of the invention include storing the user query and the customized response.

As also detailed herein, at least one embodiment of the invention includes creating a progressively increasing map of a knowledge state of multiple topics covered during a portion of video content viewed by a user, wherein said creating comprises utilizing one or more processing techniques to process at least one of (i) text input, (ii) audio input and (iii) video input derived from the video content. Such an embodiment further includes analyzing a knowledge base to determine a response to a user query submitted during the portion of the video content viewed by the user, customizing the response for the user based on (i) the map of the knowledge state and (ii) a collection of one or more items of context information pertaining to the user, presenting the customized response to the user subsequent to the user query being submitted. Further, such an embodiment includes presenting, to the user during the portion of the video content viewed by the user, (i) one or more additional queries submitted by one or more additional users and (ii) responses corresponding thereto.

Presenting (i) the one or more additional queries submitted by one or more additional users and (ii) the responses corresponding thereto can include visualizing each of (i) the one or more additional queries submitted by one or more additional users and (ii) the responses corresponding thereto on a screen being utilized by the user at a time during the portion of the video content viewed by the user relevant to the given additional query and response thereto. Additionally, the one or more additional queries submitted by one or more additional users and the responses corresponding thereto can be selected at random for presentation to the user and/or selected based on information pertaining to the user's state of knowledge related to the video content. The information pertaining to the user's state of knowledge can be determined, for example, via a profile of the user.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
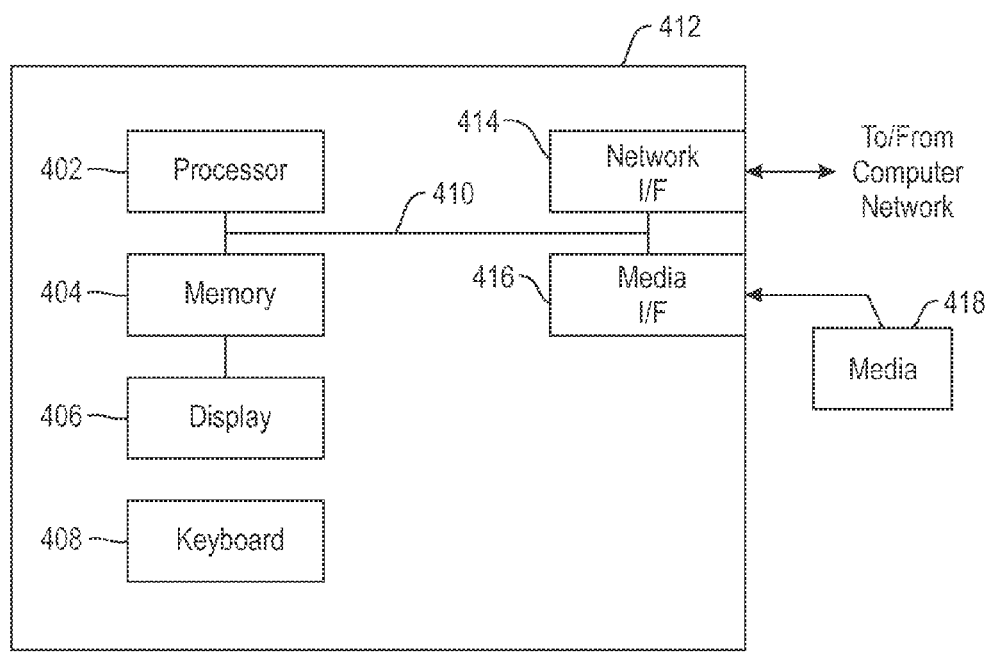
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, utilizing language processing techniques such as speech-to-text processing to create a mind map of topics covered by a user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    creating a progressively increasing map of a knowledge state as a function of time based on one or more topics covered during a user session by utilizing one or more processing techniques to process at least one of (i) text input, (ii) audio input and (iii) video input derived from presented content of the user session, wherein the one or more processing techniques comprises a video extraction technique to determine one or more visual attributes of the presented content of the user session, and wherein each of the one or more topics of the map of the knowledge state is associated with a percentage indicating how much of the given topic has been covered by the user during the user session;
    analyzing a knowledge base to determine a response to a user query submitted during the user session;
    comparing the created map of the knowledge state to a map of the knowledge state of the user prior to presentation of the content of the user session;
    determining a change between the created map of the knowledge state and the map of the knowledge state of the user prior to presentation of the content of the user session; and
    customizing the response to the user based on (i) the created map of the knowledge state and (ii) the determined change.

2. The method of claim 1, comprising:
    adding one or more items of context information pertaining to the user to the collection for each additional user session.

3. The method of claim 1, wherein said one or more processing techniques comprises a speech-to-text conversion technique.

4. The method of claim 1, wherein said one or more processing techniques comprises a conversion technique to transfer the text input to the map of the knowledge state based on available text of the content of the user session.

5. The method of claim 1, wherein said utilizing the one or more processing techniques is carried out in real-time during the user session.

6. The method of claim 1, wherein said utilizing the one or more processing techniques is carried out prior to the user session.

7. The method of claim 1, wherein said customizing the response comprises referring the user, in the response, to a portion of the content not yet covered during the user session.

8. The method of claim 1, wherein said customizing the response comprises referring the user, in the response, to separate content from the content of the user session.

9. The method of claim 8, wherein said referring the user to separate content comprises referring the user to a given time interval in the separate content.

10. The method of claim 1, comprising:
    presenting the customized response to the user subsequent to the user query being submitted; and
    presenting, to the user during the portion of the video content viewed by the user, (i) one or more additional queries submitted by one or more additional users and (ii) responses corresponding thereto.

11. The method of claim 10, wherein said presenting (i) the one or more additional queries submitted by the one or more additional users and (ii) the responses corresponding thereto comprises visualizing each of (i) the one or more additional queries submitted by the one or more additional users and (ii) the responses corresponding thereto on a screen being utilized by the user at a time during the portion of the video content viewed by the user relevant to the given additional query and response thereto.

12. The method of claim 10, wherein (i) the one or more additional queries submitted by the one or more additional users and (ii) the responses corresponding thereto are selected at random for presentation to the user.

13. The method of claim 10, wherein (i) the one or more additional queries submitted by the one or more additional users and (ii) the responses corresponding thereto are selected based on information pertaining to the user's state of knowledge related to the video content.

14. The method of claim 13, wherein the information pertaining to the user's state of knowledge is determined via a profile of the user.

15. A computer program product, the computer program product comprising a computer readable storage medium having program instructions embodied therewith, the program instructions executable by a computing device to cause the computing device to:

create a progressively increasing map of a knowledge state as a function of time based on one or more topics covered during a user session by utilizing one or more processing techniques to process at least one of (i) text input, (ii) audio input and (iii) video input derived from presented content of the user session, wherein the one or more processing techniques comprises a video extraction technique to determine one or more visual attributes of the presented content of the user session, and wherein each of the one or more topics of the map of the knowledge state is associated with a percentage indicating how much of the given topic has been covered by the user during the user session;

analyze a knowledge base to determine a response to a user query submitted during the user session;

compare the created map of the knowledge state to a map of the knowledge state of the user prior to presentation of the content of the user session;

determine a change between the created map of the knowledge state and the map of the knowledge state of the user prior to presentation of the content of the user session; and customize the response to the user based on (i) the created map of the knowledge state and (ii) the determined change.

16. A system comprising:

a memory; and at least one processor coupled to the memory and configured for:

creating a progressively increasing map of a knowledge state as a function of time based on one or more topics covered during a user session by utilizing one or more processing techniques to process at least one of (i) text input, (ii) audio input and (iii) video input derived from presented content of the user session, wherein the one or more processing techniques comprises a video extraction technique to determine one or more visual attributes of the presented content of the user session, and wherein each of the one or more topics of the map of the knowledge state is associated with a percentage indicating how much of the given topic has been covered by the user during the user session;

analyzing a knowledge base to determine a response to a user query submitted during the user session;

comparing the created map of the knowledge state to a map of the knowledge state of the user prior to presentation of the content of the user session;

determining a change between the created map of the knowledge state and the map of the knowledge state of the user prior to presentation of the content of the user session; and customizing the response to the user based on (i) the created map of the knowledge state and (ii) the determined change.

* * * * *